(12) United States Patent
Fei et al.

(10) Patent No.: US 9,685,816 B2
(45) Date of Patent: Jun. 20, 2017

(54) POWER RECEIVER FOR WIRELESS CHARGING SYSTEM

(71) Applicant: FREESCALE SEMICONDUCTOR, INC., Austin, TX (US)

(72) Inventors: Zhendong Fei, Shanghai (CN); Xiang Gao, Shanghai (CN); Chongli Wu, Queen Creek, AZ (US)

(73) Assignee: NXP USA,INC., Austin, TX (US)

( * ) Notice: Subject to any disclaimer, the term of this patent is extended or adjusted under 35 U.S.C. 154(b) by 119 days.

(21) Appl. No.: 14/887,289

(22) Filed: Oct. 19, 2015

(65) Prior Publication Data

US 2016/0294195 A1 Oct. 6, 2016

(30) Foreign Application Priority Data

Apr. 3, 2015 (CN) .......................... 2015 1 0262062

(51) Int. Cl.
*H02J 5/00* (2016.01)
*H02J 7/02* (2016.01)
*H02J 50/80* (2016.01)

(52) U.S. Cl.
CPC .............. *H02J 7/025* (2013.01); *H02J 50/80* (2016.02)

(58) Field of Classification Search
None
See application file for complete search history.

(56) References Cited

U.S. PATENT DOCUMENTS

| 4,146,903 | A | | 3/1979 | Dobkin | |
|---|---|---|---|---|---|
| 5,613,229 | A | * | 3/1997 | Baranowski | .......... H02J 7/0054 323/285 |
| 6,650,097 | B2 | | 11/2003 | Sakurai | |
| 7,084,621 | B2 | | 8/2006 | Gotkis | |
| 2007/0182367 | A1 | * | 8/2007 | Partovi | ................... H01F 5/003 320/108 |
| 2009/0153107 | A1 | * | 6/2009 | Chen | ........................ G05F 1/66 323/234 |
| 2011/0057606 | A1 | | 3/2011 | Saunamäki | |
| 2011/0127951 | A1 | * | 6/2011 | Walley | .................... H02J 7/025 320/108 |
| 2014/0139180 | A1 | | 5/2014 | Kim | |
| 2014/0159654 | A1 | * | 6/2014 | Lee | ......................... H02J 7/025 320/108 |
| 2014/0239732 | A1 | * | 8/2014 | Mach | ....................... H02J 5/00 307/104 |

FOREIGN PATENT DOCUMENTS

CN 101789638 B 8/2012

* cited by examiner

*Primary Examiner* — Jared Fureman
*Assistant Examiner* — Joel Barnett
(74) *Attorney, Agent, or Firm* — Charles E. Bergere

(57) ABSTRACT

A power receiver for a wireless power transmission system that includes a power transmitter has input circuitry that converts power received from the power transmitter into an input signal. A regulator regulates the input signal to generate a regulated output signal based on a current reference signal and a voltage reference signal, and a load receives the regulated output signal. The regulator controls at least one of the current reference signal and the voltage reference signal to control power loss within the regulator. In one embodiment, the regulator globally controls the voltage of the rectified input signal and locally controls the current reference signal to limit power loss in the regulator as well as meet system load requirements.

7 Claims, 3 Drawing Sheets

POWER RECEIVER FOR WIRELESS CHARGING SYSTEM

BACKGROUND

The present invention relates to electronics and, more particularly, to a power receiver for a wireless power transmission systems.

A wireless power transmission system, such as a wireless charging system for a cell phone or other battery-powered electronic device, includes a power transmitter and a power receiver that (i) picks up power transmitted wirelessly by the power transmitter and (ii) applies the picked-up power to a load, such as a cell phone battery, e.g., to achieve wireless charging. In typical wireless power transmission systems, the amount of power picked up by the power receiver can be very dynamic. As such, conventional power receivers for wireless power transmission systems are designed with regulator circuitry to meet the system load requirements. Unfortunately, such regulator circuitry can be the source of significant power losses that adversely affect the overall efficiency of the power transfer from the power transmitter to the load. Thus, it would be advantageous to have a more efficient power receiver.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the invention is a power receiver for a wireless power transmission system. The power receiver comprises (i) input circuitry that converts wireless power transmitted wirelessly from a power transmitter into an input signal and (ii) a regulator that regulates the input signal to generate a regulated output signal based on a current reference signal and a voltage reference signal. The output signal is applied to a load, to, for example, charge the battery of a portable device such as a cell phone. The regulator controls at least one of the current reference signal and the voltage reference signal to control power loss within the regulator.

In another embodiment, the invention provides a method for a power receiver that receives power transmitted wirelessly from a power transmitter. The power receiver globally controls a voltage level of an input signal within the power receiver to regulate a voltage level of an output signal applied by the power receiver to a load. The power receiver also locally controls at least one of a current reference signal and a voltage reference signal to control power loss within the power receiver.

Figure 1:
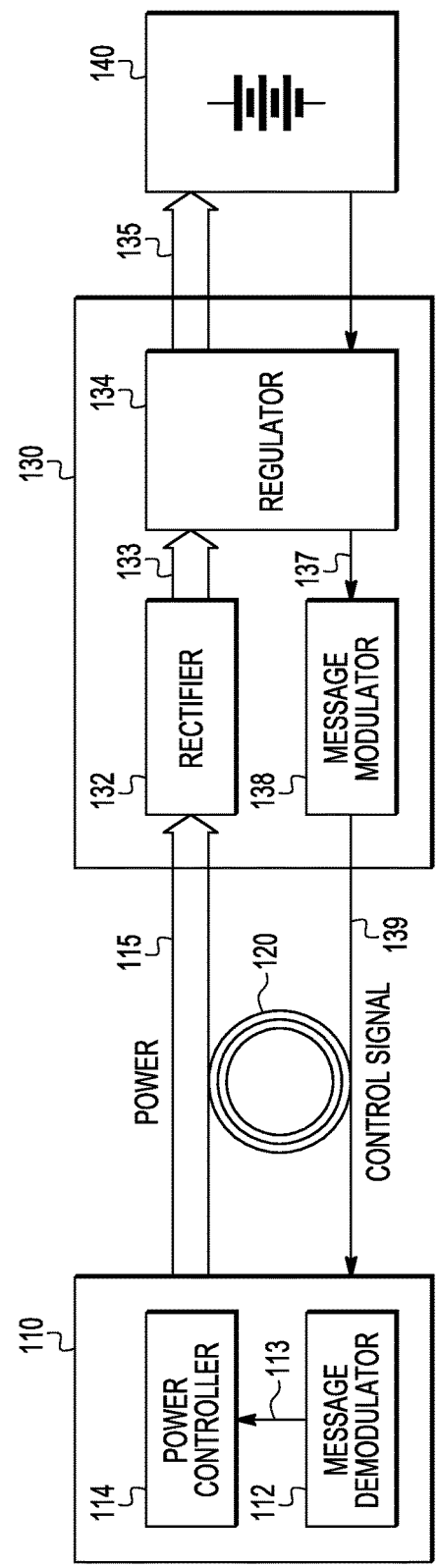
FIG. 1 is a simplified schematic block diagram of a wireless power transmission system according to one embodiment of the invention.

Referring now to FIG. 1, a simplified block diagram of a wireless power transmission system 100 according to one embodiment of the invention is shown. The system 100 includes a power transmitter 110, a power receiver 130, and a load 140. The power transmitter 110 transmits power wirelessly to the power receiver 130, which receives the power and provides it to the load 140.

In the system 100, wireless power transfer is achieved using a primary coil (not explicitly shown) in the power transmitter 110 and a corresponding, secondary coil (also not explicitly shown) in the power receiver 130, where the primary and secondary coils are magnetically coupled to effectively function as a coreless transformer, represented as 120 in FIG. 1, that wirelessly transfers power 115 from the primary coil to the secondary coil and also power control signals 139 from the secondary coil to the primary coil.

In implementations of the system 100 that perform wireless charging, the load 140 is typically a battery for a cell phone or other electronic device that includes the power receiver 130 and the battery, where the wireless power picked up by the power receiver 130 is used to charge the battery and/or to power a circuit, such as a phone display. In implementations of the system 100 that perform wireless powering, the electronic device is an RFID tag, a wireless smartcard, or other electronic device that does not have a battery so the wireless power picked up by the power receiver 130 and directly used to power the device.

The power receiver 130 includes a rectifier 132, a regulator 134, and a control message modulator 138.

The rectifier 132 rectifies the power signal 115 picked up by the secondary coil and provides a rectified input signal 133 to the regulator 134, which regulates the rectified input signal 133 to provide a regulated output signal 135 to the load 140. The secondary coil and the rectifier 132 form input circuitry of the power receiver 130 that converts transmitted wireless power from the power transmitter 110 into the rectified input signal 133.

As explained in further detail below, the regulator 134 monitors the voltage level Vrect of the rectified input signal 133 as well as the voltage level Vout and the current level Iout of the regulated output signal 135 to reduce the power loss within the regulator 134.

The power receiver 130 is able to communicate with the power transmitter 110 via their shared, effective transformer 120 using the wireless power control signals 139 to request the power transmitter 110 either to increase or decrease its transmit power level as needed to meet the system load requirements. In particular, if the regulator 134 determines that the rectified voltage level Vrect is too low (i.e., below a predetermined value), then the regulator 134 will provide a suitable error signal 137 to cause the control message modulator 138 to generate a corresponding power control signal 139 requesting the power transmitter 110 to increase its transmit power level. Similarly, if the regulator 134 determines that the rectified voltage level Vrect is too high (e.g., than another predetermined value), then the regulator 134 will provide a suitable error signal 137 to cause the control message modulator 138 to generate a corresponding power control signal 139 requesting the power transmitter 110 to decrease its transmit power level.

The power transmitter 110 includes (i) a control message demodulator 112 that decodes the power control signals 139 received from the power receiver 130 and (ii) a power controller 114 that appropriately controls the transmitter's transmit power level, at least in part based on the corresponding decoded power control signals 113.

Figure 2:
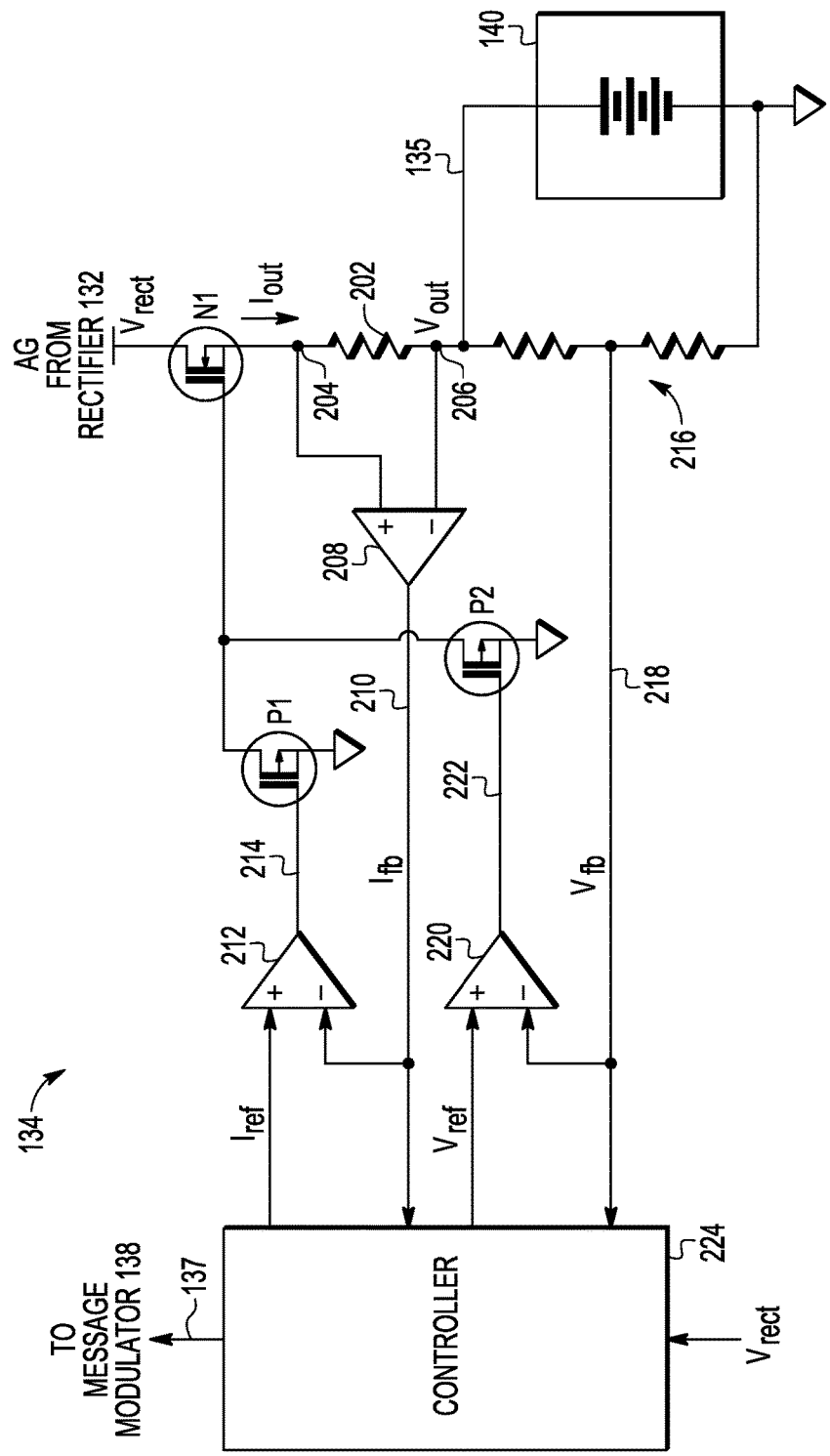
FIG. 2 is a simplified schematic block diagram of the regulator of the power receiver of FIG. 1 connected to the load.

FIG. 2 is a simplified schematic block diagram of the regulator 134 of the power receiver 130 of FIG. 1 connected to the load 140. As shown in FIG. 2, the regulator 134 receives the rectified input signal 133 having the rectified voltage level Vrect from the rectifier 132 of FIG. 1 and provides the regulated output signal 135 having the output voltage level Vout and the output current level Iout to the load 140. In addition, the regulator 134 provides the error signals 137 to the control message modulator 138 of FIG. 1.

The difference between the rectified voltage level Vrect and the output voltage level Vout results in the output current level Iout flowing through the n-type power MOSFET (metal-oxide semiconductor field-effect transistor) N1 and the current-sensing resistor 202.

The voltages at nodes 204 and 206 are applied to the input ports of the differential amplifier 208, whose output signal 210 indicates the output current level Iout. The voltage level of the output signal 210 functions as a current feedback signal Ifb indicating the output current level Iout. The current feedback signal Ifb is applied to the negative input port of the operational amplifier (opamp) 212, which receives a current reference signal Iref at its positive input port. The output signal 214 from the opamp 212 is applied to the gate (aka control node) of the p-type control MOSFET P1, whose drain (aka output node) is connected to the gate of the power MOSFET N1.

Similarly, the voltage divider 216 generates a signal 218 whose voltage level functions as a voltage feedback signal Vfb indicating the output voltage level Vout. The voltage feedback signal Vfb is applied to the negative input port of the opamp 220, which receives a voltage reference signal Vref at its positive input port. The output signal 222 from the opamp 220 is applied to the gate of the p-type control MOSFET P2, whose drain is also connected to the gate of the power MOSFET N1. Note that, in certain implementations, the current drawn by the voltage divider 216 is sufficiently low such that the current applied to the load 140 will be substantially equal to the current measured across the resistor 202.

In operation, when the voltage feedback signal Vfb is greater than the voltage reference signal Vref, then the output signal 222 from the opamp 220 will decrease, which will turn the control MOSFET P2 on more, which will decrease its drain voltage and therefore decrease the gate voltage of the power MOSFET N1, which will turn the power MOSFET N1 off more, thereby reducing the output voltage Vout, which causes the voltage feedback signal Vfb also to drop.

Similarly, when the voltage feedback signal Vfb is less than the voltage reference signal Vref, then the output signal 222 from the opamp 220 will increase, which will turn the control MOSFET P2 off more, which will increase its drain voltage and therefore increase the gate voltage of the power MOSFET N1, which will turn the power MOSFET N1 on more, thereby increasing the output voltage Vout, which causes the voltage feedback signal Vfb also to rise.

In this way, the voltage feedback signal Vfb will be driven to be (substantially) equal to the voltage reference signal Vref, at which point, the output voltage level Vout is said to be in regulation.

When the output voltage level Vout is in regulation, if the current feedback signal Ifb is greater than the current reference signal Iref, then the output signal 214 from the opamp 212 will decrease, which will turn the control MOSFET P1 on more, which will decrease its drain voltage and therefore decrease the gate voltage of the power MOSFET N1, which will turn the power MOSFET N1 off more, thereby reducing the output current Iout and the output voltage Vout, which causes the current feedback signal Ifb also to drop.

When the output voltage level Vout is in regulation, if the current feedback signal Ifb is less than the current reference signal Iref, then the output signal 214 from the opamp 212 will turn the control MOSFET P1 off. In this case, regulation will be provided solely by the voltage feedback loop of the opamp 220 and the control MOSFET P2.

However, when the current feedback signal Ifb is greater than the current reference signal Iref during the voltage regulation, such as when Vout is suddenly shorted, then the output signal 214 from the opamp 212 will turn the control MOSFET P1 on, which will turn the power MOSFET N1 off more to reduce the Iout level to the Iref level. In this situation, current regulation will dominate the control because the opamp 220 turns off the MOSFET P2. This is called current limitation.

Note that, at any moment, either the voltage feedback loop or the current feedback loop operates to regulate either the output voltage or the output current. Both loops never operate together.

The levels of the voltage and current reference signals Vref and Iref are controlled by the controller 224. The controller 224 can be implemented using any suitable hardware- or software-based processor. The controller 224 receives the voltage and current feedback signals Vfb and Ifb as well as the rectified voltage level Vrect. In one possible implementation described below, the controller 224 dynamically controls the current reference signal Iref based on the power loss on the MOSFET N1 that is calculated from Vfb, Ifb, and Vrect, while the voltage reference signal Vref is maintained at a fixed level corresponding to the desired output voltage level Vout specified for the particular load 140.

In addition to regulating the output voltage Vout and the output current Iout, the regulator 134 also controls the loss of power within the regulator 134, in particular, the power loss (Ploss) across the power MOSFET N1 and the current-sense resistor 202, which is given by Equation (1) as follows:

$$Ploss = (Vrect - Vout) * Iout. \quad (1)$$

As described below, the regulator 134 dynamically controls the power loss (Ploss) using an algorithm that adjusts two parameters: the current reference level Iref and the desired rectified voltage level Vrect_desired.

Figure 3:
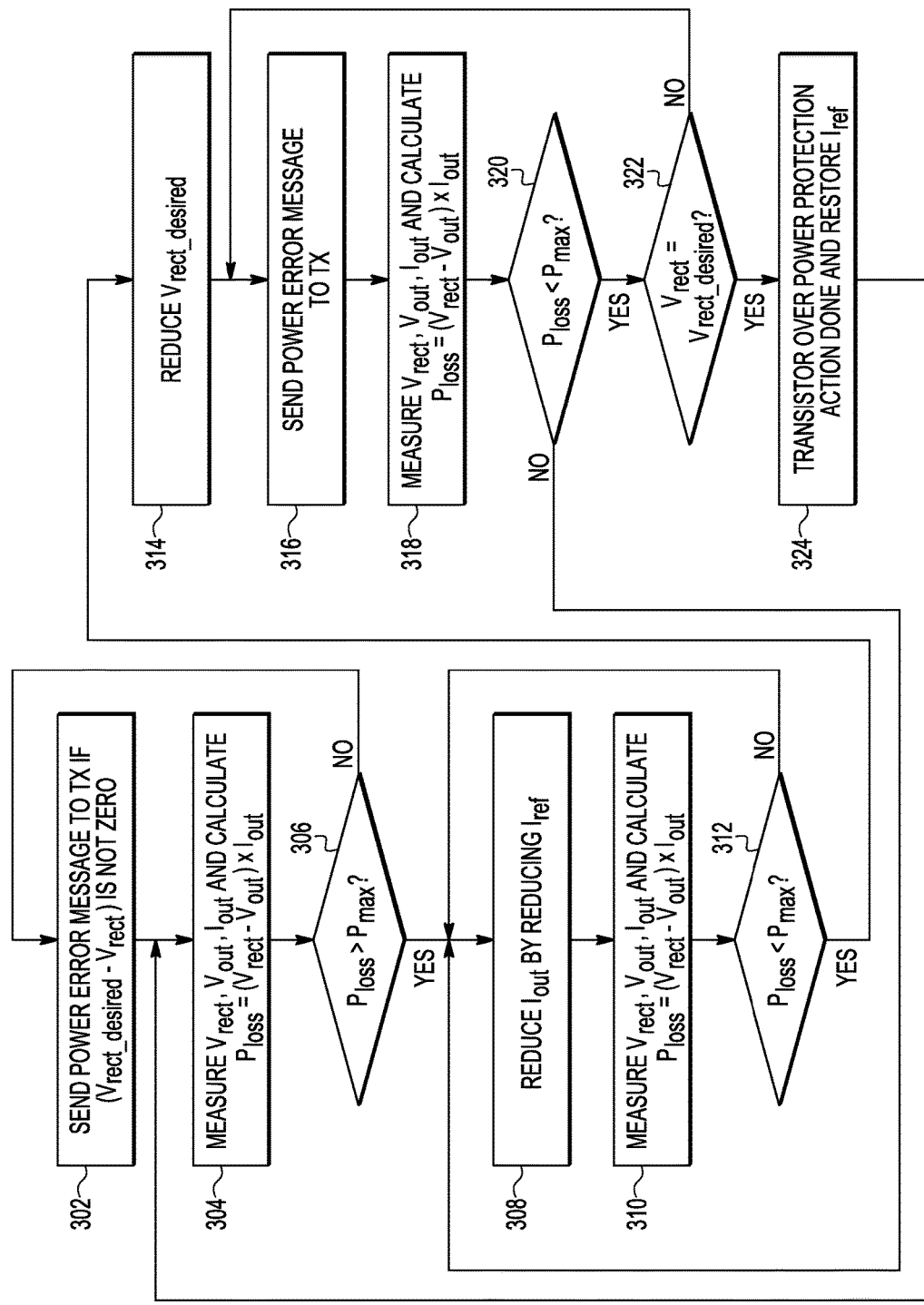
FIG. 3 is a flow chart illustrating the algorithm implemented by the controller of FIG. 2 to control the current reference level and the desired rectified voltage level.

FIG. 3 is a flow chart illustrating the procedure implemented by the controller 224 of FIG. 2 to control the current reference level Iref and the desired rectified voltage level Vrect_desired. By controlling the desired rectified voltage level Vrect_desired, the controller 224 controls the power loss (Ploss) globally, i.e., with the help of the power transmitter 110. Although, this control can be relatively slow, by controlling the current reference level Iref, the controller 224 controls the power loss (Ploss) locally, i.e., within the regulator 134, which can be significantly quicker than the global control involving the power transmitter 110.

Note that, when the procedure of FIG. 3 begins, the current reference level Iref and the voltage reference level Vref are both initialized to specified (e.g., programmed), respective, a priori, initial values. The procedure of FIG. 3 dynamically adjusts the value of the current reference level Iref, but leaves the voltage reference level Vref fixed at its initial value.

The procedure begins at step 302 with the controller 224 determining whether the rectified voltage level Vrect of the actual rectified input signal 133 received from the rectifier 132 is equal to the most-recently specified value for the desired rectified voltage level Vrect_desired. If not, then the controller 224 generates an appropriate error signal 137 to cause the control message modulator 138 to generate a corresponding power control signal 139 that requests the power transmitter 110 to either increase or decrease its transmit power level as appropriate, which will in turn and eventually result in the rectified voltage level Vrect correspondingly increasing or decreasing.

Note that, in order to prevent the procedure from oscillating undesirably, the controller 224 may determine that Vrect is "equal to" Vrect_desired if the magnitude of the difference between the two values is less than a specified threshold. Alternatively, the controller 224 could apply some degree of hysteresis to avoid undesirable control oscillations.

Step 302 represents the dynamic, global control implemented by the controller 224 over the magnitude of the power loss (Ploss). Most, but not all of the remaining steps represent the dynamic, local control implemented by the controller 224 over the magnitude of the power loss (Ploss).

At step 304, the controller 224 measures the rectified voltage level Vrect, the output voltage Vout (as indicated by the voltage feedback signal Vfb), and the output current Iout (as indicated by the current feedback signal Ifb) and calculates the present level of the power loss (Ploss) using Equation (1). Note that, depending on how the voltage divider 216 is implemented, the voltage feedback signal Vfb will be a fraction of the output voltage Vout, which fraction will be known to (e.g., programmed into) the controller 224. Similarly, there will be a relationship between the current feedback signal Ifb and the output current Iout, which relationship is known to the controller 224.

At step 306, the controller 224 determines whether or not the calculated present power loss (Ploss) is greater than a specified, a priori, maximum desired power loss Pmax for the regulator 134. If Ploss is not greater than Pmax, then processing returns to step 302. If Ploss is greater than Pmax, then processing proceeds to step 308, where the controller 224 reduces the value of Iref, which may result in Iref being less than the current feedback signal Ifb. If Iref is less than Ifb, then as explained above with reference to FIG. 2, the operations of the regulator 134 will lead to a reduction in the output current level Iout and a concomitant reduction in the power loss (Ploss).

At step 310, the controller 224 again measures Vrect, Vout, and Iout and calculates the present power loss (Ploss), and, at step 312, the controller 224 determines whether Ploss is less than Pmax. If not, then processing returns to step 308, where the controller 224 further reduces the value of Iref. This process of reducing Iref is repeated until the controller 224 determines, at step 312, that the present power loss (Ploss) is less than Pmax, in which case, processing proceeds to step 314.

At this point in the processing, the controller 224 has reacted locally to a determination that the present power loss (Ploss) is greater than the maximum desired power loss Pmax by reducing the current reference signal Iref to result in a sufficient reduction in Iout to reduce the present power loss (Ploss) to a level below Pmax. Note that, according to Equation (1), reducing Iout will tend to cause Ploss to decrease, but, in some cases, reducing Vout due to load condition changes, such as changes in resistive load, while keeping Vrect fixed, will tend to reduce Iout further, which may in turn cause the load circuit (e.g., sensors) to stop working.

To address both of these issues, at step 314, the controller 224 reduces the desired rectified voltage level Vrect_desired in order to reduce Vrect. At step 316, the controller 224 generates an appropriate error signal 137 that will cause the control message modulator 138 to generate a corresponding power control signal 139 that will cause the power transmitter 110 to decrease its transmit power level, which should result in a decrease in Vrect.

At step 318, the controller 224 again measures Vrect, Vout, and Iout and calculates the present power loss (Ploss), and, at step 320, the controller 224 again determines whether Ploss is less than Pmax. If Ploss is not less than Pmax, then processing returns to step 308 to further reduce Iref and therefore Iout to once again attempt to get Ploss less than Pmax.

If, at step 320, the controller 224 determines that Ploss is less than Pmax, then processing proceeds to step 322, where the controller 224 determines whether Vrect is equal to (or at least sufficiently close to) Vrect_desired. If not, then processing returns to step 316, where the controller 224 generates another appropriate error message 137 to cause the power transmitter 110 to again adjust its transmit power level. Note that, depending on whether Vrect is greater than or less than Vrect_desired, the error message 137 will cause the power transmitter 110 either to decrease or increase its transmit power level.

This processing will continue to adjust both Iref and Vrect_desired as needed until both (1) Ploss is less than Pmax and (2) Vrect is (approximately) equal to Vrect_desired. At that point, processing proceeds to step 324, where the value of Iref is restored to its original, specified level. Processing then returns to steps 304 and 306 to calculate and determine whether the restored Iref level results in Ploss again being greater than Pmax.

The procedure of FIG. 3 enables the controller 224 to dynamically and directly control the values of both Vrect_desired and Iref in order to control the levels of both Vrect and Iout to keep the present power loss Ploss less than or equal to Pmax. Although the procedure does not actively control the level of the voltage reference signal Vref, in other implementations, the controller 224 actively controls Vref in addition to or instead of Iref and/or Vrect_desired.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Also, for purposes of this disclosure, it is understood that all gates are powered from a fixed-voltage power domain (or domains) and ground unless shown otherwise. Accordingly, all digital signals generally have voltages that range from approximately ground potential to that of one of the power domains and transition (slew) quickly. However and unless stated otherwise, ground may be considered a power source having a voltage of approximately zero volts, and a power source having any desired voltage may be substituted for ground. Therefore, all gates may be powered by at least two power sources, with the attendant digital signals therefrom having voltages that range between the approximate voltages of the power sources.

Signals and corresponding nodes, ports, or paths may be referred to by the same name and are interchangeable for purposes here.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A power receiver for a wireless power transmission system, the power receiver comprising:
   input circuitry that converts power transmitted wirelessly from a power transmitter into an input signal; and
   a regulator, connected to the input circuitry, that regulates the input signal to generate a regulated output signal based on a current reference signal and a voltage reference signal, wherein:
   the output signal is applied to a load; and
   the regulator controls at least one of the current reference signal and the voltage reference signal to control power loss within the power receiver;
   the regulator (i) senses output voltage level and output current level of the output signal, (ii) generates the regulated output signal based on the sensed output voltage level and the sensed output current level, and (iii) adjusts the current reference signal to control the power loss within the receiver;
   the regulator comprises:
      a power transistor having a control node, an input node that receives the input signal, and an output node that provides the output signal; and
      control circuitry that controls a voltage level at the control node of the power transistor based on the voltage reference signal, the sensed output voltage level, the current reference signal, and the sensed output current level;
   the control circuitry comprises:
      voltage-based control circuitry that controls the voltage level at the control node of the power transistor based on a comparison of the voltage reference signal and the sensed output voltage; and
      current-based control circuitry that controls the voltage level at the control node of the power transistor based on a comparison of the current reference signal and the sensed output current level;
   the voltage-based control circuitry comprises:
      a differential amplifier connected to receive the voltage reference signal and the sensed output voltage level; and
      a first control transistor having a control node connected to an output of the differential amplifier, and an output node connected to the control node of the power transistor; and
   the current-based control circuitry comprises:
      a first operational amplifier (opamp) connected to receive the current reference signal and the sensed output current level; and
      a second control transistor having a control node connected to an output of the first opamp, and an output node connected to the control node of the power transistor.

2. The power receiver of claim 1, wherein the input circuitry comprises:
   a secondary coil that electromagnetically interacts with a primary coil of the power transmitter; and
   a rectifier that rectifies a picked-up signal in the secondary coil to generate the input signal.

3. The power receiver of claim 1, wherein:
   the sensed output voltage level is generated by a voltage divider connected to the regulated output signal; and
   the sensed output current level is generated by a second opamp whose inputs are connected across a resistance connected to the power transistor.

4. The power receiver of claim 1, wherein:
   the regulator determines present power loss within the receiver based on a voltage level of the input signal, an output voltage level of the output signal, and an output current level of the output signal;

if the present power loss is greater than a predetermined value, then the regulator decreases the current reference signal from an initial current reference level until the present power loss is less than or equal to the predetermined value;

after decreasing the current reference signal, the regulator causes a request to be transmitted to the power transmitter to decrease its transmit power level to decrease the voltage level of the input signal; and after causing the voltage level of the input signal to be decreased, the regulator restores the current reference signal to the initial current reference level.

5. A method for a power receiver receiving power transmitted wirelessly from a power transmitter to control power loss, the method comprising:

the power receiver globally controlling a voltage level of an input signal within the power receiver to regulate a voltage level of an output signal applied by the power receiver to a load; and the power receiver locally controlling at least one of a current reference signal and a voltage reference signal to control the power loss within the power receiver, wherein:

the power receiver determines present power loss within the power receiver based on the voltage level of the input signal, the voltage level of the output signal, and the current level of the output signal;

if the power receiver determines that the present power loss is greater than a predetermined maximum value, then the power receiver decreases the current reference signal from an initial current reference level until the power receiver determines that the present power loss is not greater than the predetermined maximum value;

after decreasing the current reference signal, the power receiver transmits a request to the power transmitter to decrease its transmit power level to decrease the voltage level of the input signal.

6. The method of claim 5, wherein the power receiver (i) senses output voltage level and output current level of the output signal, (ii) generates the output signal based on the sensed output voltage level and the sensed output current level, and (iii) adjusts the current reference signal to control the power loss within the power receiver.

7. The method of claim 5, wherein:

after causing the voltage level of the input signal to be decreased, the power receiver restores the current reference signal to the initial current reference level.

* * * * *